United States Patent [19]

Weiss et al.

[11] 4,381,288
[45] Apr. 26, 1983

[54] MERCURY BRINE SLUDGE TREATMENT

[75] Inventors: Samuel Weiss, River Edge, N.J.; Andrew R. Lechuga, Baton Rouge, La.

[73] Assignee: Stauffer Chemical Company, Westport, Conn.

[21] Appl. No.: 311,566

[22] Filed: Oct. 15, 1981

[51] Int. Cl.³ .............................................. C01G 13/00
[52] U.S. Cl. .................................. 423/101; 423/109; 210/901
[58] Field of Search ..................... 210/772, 783, 400; 423/99, 109; 204/99; 423/101

[56] References Cited

U.S. PATENT DOCUMENTS

| | | | |
|---|---|---|---|
| 2,111,720 | 3/1938 | Padgett | 210/400 |
| 3,785,942 | 1/1974 | Carlson | 75/121 |
| 3,966,611 | 6/1976 | Gibbs | 210/400 |
| 4,124,459 | 11/1978 | Blanch | 423/99 |
| 4,149,879 | 4/1979 | Loo | 423/109 |
| 4,278,539 | 7/1981 | Santhanam | 423/101 |

Primary Examiner—Brian E. Hearn
Attorney, Agent, or Firm—Vivienne T. White

[57] ABSTRACT

A process is provided for treating brine sludge to render it suitable for ecologically safe disposal by removing therefrom leachable mercury impurities. The process comprises dewatering the sludge and conveying the dewatered sludge through a series of water washings to remove therefrom leachable mercury to render it suitable for land fill disposal.

7 Claims, 1 Drawing Figure

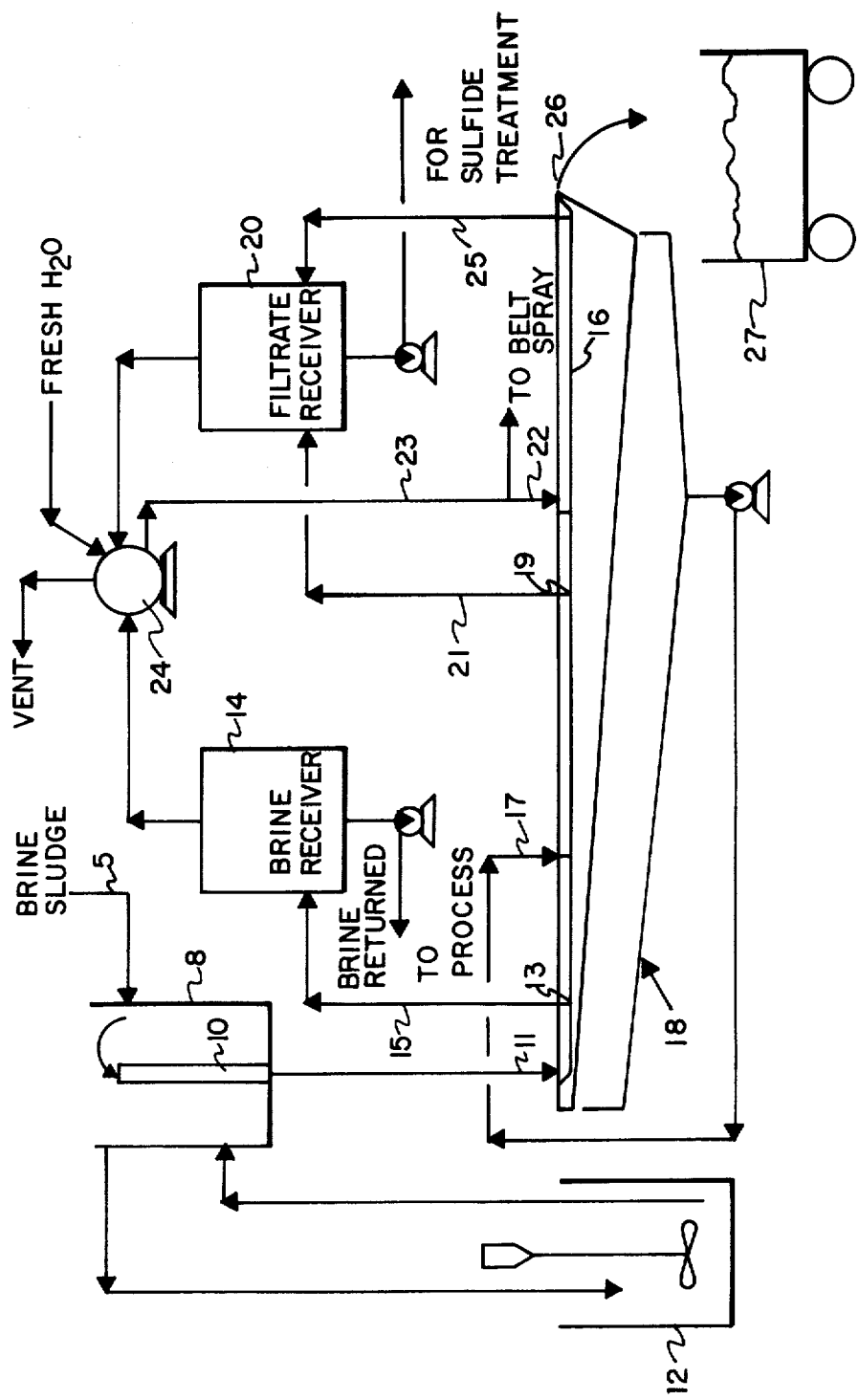

MERCURY BRINE SLUDGE TREATMENT

BACKGROUND OF THE INVENTION

1. Field of the Invention

The invention relates to the extraction of leachable mercury from insoluble mercury containing waste products. The invention more particularly relates to the removal of leachable mercury from waste sludges derived from chlor-alkali plants to render it suitable for land fill or other purposes.

2. Related Art

Ecologically and economically it is important to prevent loss of mercury from industrial processes. Operation of mercury cathode alkali-chlorine electrolysis cells are a significant source of industrial mercury consumption. Mercury solubilized in the depleted cell brine is normally returned to the electrolysis cells. Invariably, however, some mercury escapes from the process cycle when insoluble waste products designated "sludge" are purged from the electrolysis operation together with brine saturated with dissolved elemental mercury and mercury chloride complex.

Mercury cathode electrolysis brine "sludge" is a brine insoluble waste product, originating from a variety of sources in mercury cathode brine electrolysis cell operations. Clarifier sludge and saturator sludge comprise the most important types of sludges. Clarifier sludge is a precipitate formed when alkali-metal carbonate or hydroxide (e.g., sodium carbonate and/or sodium hydroxide) is added to brine to precipitate unwanted alkali earth metal and other metal ions. Saturator sludge is a residue resulting from the reconcentration of depleted brine by dissolving solid alkali-metal chlorides (e.g., sodium chloride). Sludge may also arise from other process related apparatus or operations such as cell box washing, filter backwashes, or solids contained in purge streams. Sludge of different types may be combined. Optionally, sludges may be concentrated in settling ponds to increase solids or mercury contents.

In the operation of the chlor-alkali plant, sediments from the saturator and the clarifier have traditionally been stored in ponds on the plant site. Removal of the process sludge to land fill sites is complicated by the fact that the sludge is judged hazardous if it contains over 20 ppb of mercury by Extraction Procedure Analysis as specified by E. P. A. in the Federal Reg. Vol. 43 No. 243 pg. 58952.

In the treatment of mercury containing waste materials, one widely used method is to heat the mercury containing waste in a retort to recover the metallic mercury. Caustic sludges, however, such as those obtained from an amalgam decomposer cannot be fed to a retort without causing corrosive damage to the equipment. U.S. Pat. No. 4,149,879 discloses a process for recovering mercury and caustic values from caustic (brine) sludges in a process which comprises intermixing the caustic sludge with a liquid such as water or a dilute caustic solution under pressure or agitation to produce a caustic slurry which is separated into a caustic liquid, metallic mercury and remaining sludge which is suitable for roasting in a retort to recover better than 99% of the mercury in the sludge.

It is an object of the invention to provide a process for treating mercury-containing brine sludge which substantially eliminates the pollution of natural resources.

It is an additional object of the invention to provide a process of treating mercury-containing brine sludge to achieve a leachable mercury concentration of less than 20 ppb.

SUMMARY OF THE INVENTION

The invention comprises a process for removing leachable mercury values from mercury containing waste sludge utilizing a horizontal belt filter wherein the sludge is deposited on the filter belt dewatered and subjected to at least one water washing to remove therefrom the leachable mercury, and to render the sludge suitable for safe disposal. The mercury can advantageously be recovered from the filtrate.

BRIEF DESCRIPTION OF THE DRAWINGS

FIG. 1 is a schematic illustration of the process of the invention.

DETAILED DESCRIPTION OF THE INVENTION

Sludge is a mixture of particulate solids and brine (alkali metal solutions) and its consistency may vary from a fluid slurry to a thick slurry.

Mercury containing waste sludge which is treated in the process of the invention has a solids content ranging from about 10% to about 45% by weight. Leachable mercury is defined herein as the dissolved ionic, elemental and complexed mercury content of the waste sludge. The amount of leachable mercury contained in the sludge varies but it may normally have a mercury concentration of from about 30 ppm to about 150 ppm or from about 10 ppm to about 40 ppm based on the weight of the sludge wet cake. "Wet cake" is the filter retained solids obtained by filtration of sludge on filter paper, washed and substantially free of liquid.

In the process of the invention brine sludge containing mercury is introduced onto a horizontal endless filter belt and subjected to at least one water washing to remove therefrom leachable mercury values, which are subsequently recovered. The remaining filter cake is then disposed of in an ecologically safe manner.

In the process of the invention unprocessed mercury-containing waste sludge such as derived from chloro-alkali plants is introduced onto a horizontal filter by means which can comprise a head tank containing an overflow pipe through which the sludge drains continuously or semi-continuously onto the horizontal belt filter. The sludge is then subjected to filtration under reduced pressure or suction which removes therefrom the liquid brine filtrate. This brine filtrate is recovered and recycled to the electrolytic cell process. The sludge solids remaining on the filter belt are then subjected to one or more water washings to remove leachable mercury therefrom. The filtrates from the washings are recovered and further treated with sulfide or hydrosulfide ions to precipitate the leachable mercury values therefrom.

It was discovered that a horizontal filter belt device allowed the heavy solids material (generally $CaSO_4$ and some dissolved salts) to fall to the bottom of the sludge when deposited on the filter belt thereby forming an additional filtering surface in the filtration process. In addition it was discovered that the lighter solids such as $CaCO_3$ and the like, deposited on the heavier material and are thereby removed from the filtrate.

A conventional rotary vacuum filter tested for dewatering the sludge was totally ineffective since flow of liquid was upward. In charging the slurry to the pan in the normal manner, the dense gypsum settled to the bottom and could not be suspended sufficiently to adhere to the drum by vacuum. Further, the suspended calcium carbonate penetrated the filter cloth readily and could not be separated from the liquor.

A conventional plate and frame press would have to be charged with the feed sludge, then the feed would have to be interrupted while the increments of cake were washed and discharged. The plate and frame would not provide the capability for thorough and controlled washing through a relatively thin cake as the horizontal filter was found to provide. Not only would the washing be less effective but this equipment would be labor intensive.

Pressure leaf and cartridge type filters lack capacity and would have the same objections as the plate and frame press.

Centrifuging the slurry followed by re-slurry with fresh water and re-centrifuging, although providing comparable effectiveness, requires a considerable train of very complex and costly equipment. Even if successful, the equipment is prone to mechanical failures, aggravated by the abrasive character of the gypsum.

Clarifiers and settlers are inefficient in liquid-solid separations. For service in handling gypsum, clarifiers are proven to be high maintenance items.

Referring now to FIG. 1, there is provided an embodiment of the process of the invention. In this embodiment process waste sludge is treated to render it ecologically safe for disposal. The brine sludge in the process is derived either directly from the saturators and clarifiers or from a sump or pond where it has been stored. The brine sludge via line 5 is pumped to a head tank 8 containing an overflow pipe 10 through which the sludge continuously or semi-continuously drains onto a horizontal belt filter via line 11. The head tank 8 drains excess sludge by gravity to the sump or pond 12. Sludge is introduced through line 5 near the bottom of tank 8 to keep solids in suspension. In addition, the sump or pond contains pump means for pumping the sludge from the sump or pond to the head tank introducing recycled sludge near the bottom of tank 8 to keep solids in suspension.

The sludge conveyed to the horizontal belt filter through line 11 from the overflow pipe is filtered at 13 by applying a vacuum to the underside of the belt to remove the liquid brine (aqueous alkali metal chloride solution) contained therein which is conveyed to a receiver 14 via line 15. A vacuum box or pan 16 (comprising three sections as shown in the embodiment), located below the filter belt receives the filtrate after filtration which is conveyed to the receivers by pump means (not shown). The recovered brine as previously indicated is recycled into the brine cell process, thus recouping dissolved mercury as well as the chloride values.

The dewatered sludge is then conveyed along the belt and subjected to a first wash at 17, utilizing water recovered from belt sprays (not shown) which water is continuously sprayed on both sides of the belt or filter medium to clean and lubricate it and to remove therefrom adhering particles of solids. The water from the belt sprays is collected in a drip pan 18 and is utilized for the first wash of the dewatered waste sludge.

The washed sludge is again suctioned at 19 to remove the (filtrate) wash water which contains dissolved ionic, elemental and complex mercury leached from the sludge. This filtrate is recovered and pumped to a wash receiver 20 via line 21 from which it is conveyed for further treatment to recover the leached mercury.

The sludge can then be washed a second time as shown at 22 (or a plurality of times as needed), with fresh water (or waste water) discharged from a vacuum pump 24 such as a liquid ring vacuum pump and applied to the belt filter through line 23. The filtrate obtained from this wash is conveyed via line 25 to the wash receiver 20 and further treated to recover any leached mercury values therefrom.

The sludge remaining on the filter belt after removal of the leachable mercury therefrom is discharged from the belt discharge means 26 to a conveyor means 27 for ultimate disposal to landfill, to upgrade local clay soils for construction purposes or other disposal alternatives.

What is claimed is:

1. A process for removing leachable mercury values from mercury containing waste sludge which comprises depositing the sludge on a horizontal belt filter, dewatering the sludge, and then subjecting the dewatered sludge to at least one water washing to remove therefrom leachable mercury to a leachable content of less than 20 ppb.

2. The process of claim 1 further comprising subjecting the dewatered sludge to a plurality of washings to remove leachable mercury values therefrom.

3. A process of removing leachable mercury values from mercury-containing waste sludge to render it suitable for ecologically safe disposal comprising to steps of
   (1) depositing the sludge on a horizontal filter;
   (2) dewatering the sludge to remove liquid brine therefrom;
   (3) washing the wet cake at least once with water to remove leachable mercury values therefrom to a leachable content of less than 20 ppb; and
   (4) conveying the washed filter cake to a conveyer means for ecologically safe disposal.

4. The method of claim 3 wherein the means for dewatering the sludge is by filtration conducted under reduced pressure.

5. the method of claim 3 wherein the means for dewatering the sludge is by suction.

6. The method of claim 3 further comprising recovering the mercury values leached from the mercury containing waste sludge by treating the leached wash water with a sulfide.

7. The method of claim 3 wherein the brine removed from the sludge is recycled for further processing.

* * * * *